United States Patent
Caballero et al.

(10) Patent No.: US 9,392,042 B1
(45) Date of Patent: Jul. 12, 2016

(54) STREAMING MEDIA OPTIMIZATION

(71) Applicant: Amazon Technologies, Inc., Reno, NV (US)

(72) Inventors: Manuel José Dominic Caballero, Romsey (GB); Mark Edwin Hewis, London (GB)

(73) Assignee: Amazon Technologies, Inc., Seattle, WA (US)

( * ) Notice: Subject to any disclaimer, the term of this patent is extended or adjusted under 35 U.S.C. 154(b) by 407 days.

(21) Appl. No.: 13/872,581

(22) Filed: Apr. 29, 2013

(51) Int. Cl.
 G06F 15/16 (2006.01)
 H04L 29/06 (2006.01)
(52) U.S. Cl.
 CPC ..................... *H04L 65/60* (2013.01)
(58) Field of Classification Search
 CPC .................. H04L 67/2847; H04L 65/4084
 USPC ................................ 709/231, 232
 See application file for complete search history.

(56) References Cited

U.S. PATENT DOCUMENTS

| 5,473,479 A * | 12/1995 | Takakura ................ 360/48 |
| 2009/0234965 A1 * | 9/2009 | Viveganandhan et al. .... 709/231 |
| 2012/0151009 A1 * | 6/2012 | Bouazizi et al. ............. 709/219 |

FOREIGN PATENT DOCUMENTS

WO   WO 2013002828 A2 *   1/2013   ............. H04L 47/12

* cited by examiner

*Primary Examiner* — David Lazaro
*Assistant Examiner* — Marie Georges Henry
(74) *Attorney, Agent, or Firm* — Thomas | Horstemeyer, LLP

(57) ABSTRACT

Disclosed are various embodiments for a streaming media application. Media blocks of a media stream may be buffered at a quality level determined by an amount of available bandwidth. When excess bandwidth is made available, a higher quality replacement for a buffered media block may be obtained concurrent to streaming the media blocks. The replacement media block then replaces the lower quality media block in the buffer such that the higher quality replacement media block is rendered.

20 Claims, 4 Drawing Sheets

STREAMING MEDIA OPTIMIZATION

BACKGROUND

The quality of streaming media may be based on available bandwidth. For example, the bitrate of incoming streaming video is limited by the bandwidth available to a streaming media application. Intermittent drops in available bandwidth forces the streaming media application to temporarily request the media stream at a reduced bitrate. This results in a decrease in the quality of the media which may be perceptible to a user.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
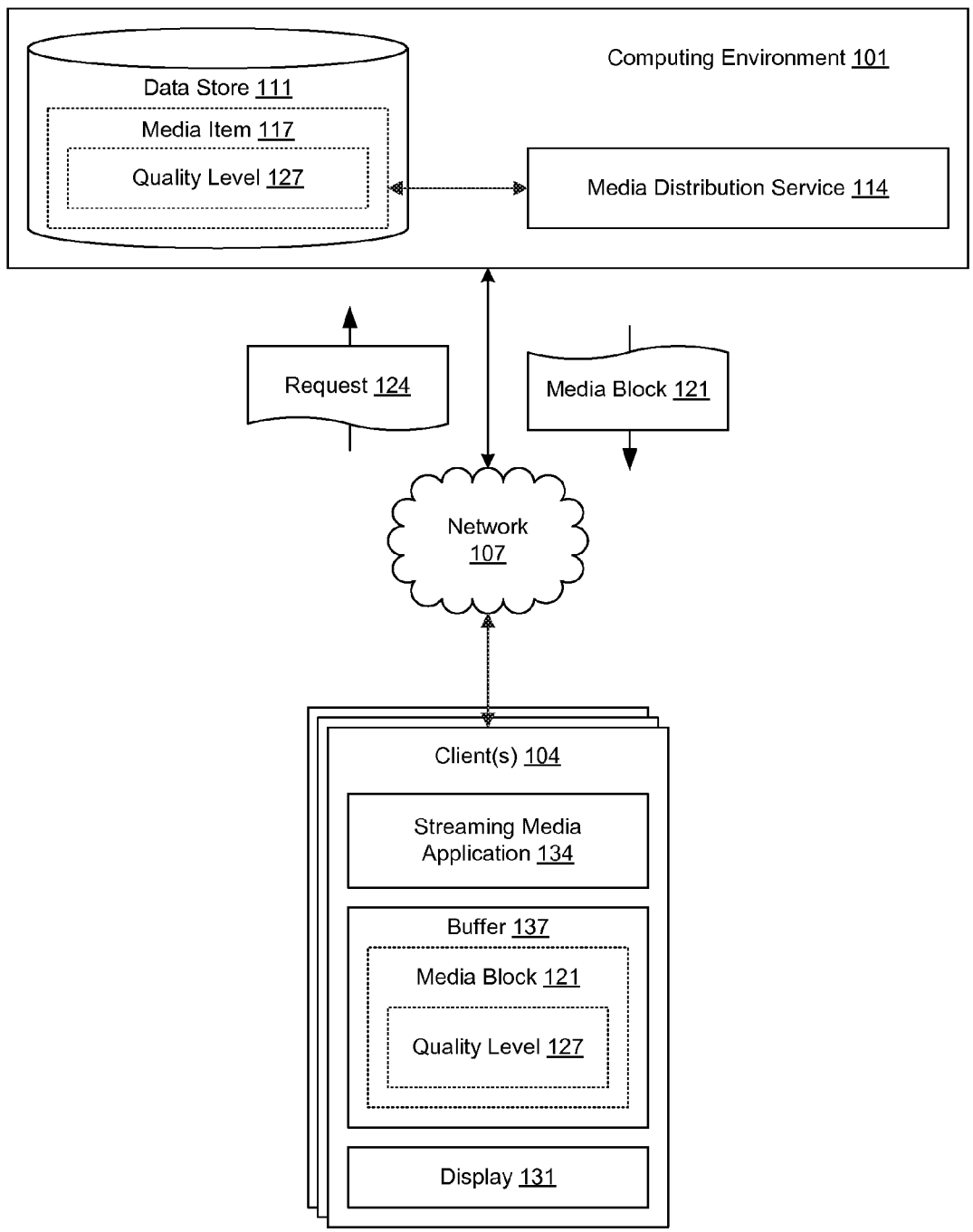
FIG. 1 is a drawing of a networked environment according to various embodiments of the present disclosure.

Clients may stream media from a media distribution service to allow near immediate access to content without necessitating a full download of the media prior to rendering. For example, if a user wished to view a large video file, it would take a significant amount of time to completely download the video file before viewing. As another example, a client device may not have enough available storage to completely download media content before playback. By streaming the video file, a client needs to only download a portion of the video file to begin viewing. The rest of the video file may be downloaded concurrently to the client rendering what video has already been downloaded. Live streams of media may also be implemented to allow for a client to render media as it is being generated by a content provider.

Typically, when accessing a media stream, an amount of streaming media is loaded into a buffer of the client. After an amount of media content has been stored into the buffer, the client will then begin rendering the buffered media content while replacing the already rendered media content in the buffer with newly obtained media content. The quality level of the streaming media may be based on available bandwidth. For example, a client having access to over four megabits-per-second of bandwidth would be able to stream media encoded at a bitrate of approximately four megabits-per-second.

During the streaming process, a client may experience an intermittent decrease in bandwidth. This may be due to sharing available bandwidth with other clients, interference in network transmissions, defects in networking components, or other factors. When an amount of bandwidth available to a client decreases, the client must then obtain the streaming media at a temporarily lower quality level. This results in lower quality media being stored in the buffer prior to rendering. Upon rendering the lower quality media, a user may experience a noticeable drop in quality, thereby decreasing overall user satisfaction.

From time to time, a client may have more bandwidth than necessary to stream media content at a maximum available quality level. For example, a client may have ten megabits-per-second of bandwidth available, while the content the client wishes to stream may be available at a maximum of five megabits-per-second. In these situations, a client will have enough bandwidth to stream the media content at the maximum quality level possible and still have additional bandwidth available.

A streaming media application may take advantage of any additional available bandwidth to replace previously obtained media content with higher quality versions. If a block of media content is stored in a buffer and has a lower quality level due to a temporary decrease in bandwidth at the time the block was obtained, the streaming media application may request a replacement block of media content at a higher quality level concurrent to streaming the media content. This allows for the media to be streamed to the client at a high quality level while concurrently replacing lesser quality blocks of media content prior to their being rendered. By replacing the lesser quality blocks of media content prior to rendering, performance decreases perceptible by a user are reduced or eliminated.

For example, the streaming media application may obtain the media stream at the maximum possible quality level during a period of high bandwidth. A temporary decrease in bandwidth forces the streaming media application to temporarily obtain the media stream at a reduced quality level. When the available bandwidth increases again, the total available bandwidth may be enough to obtain the media stream at the maximum possible quality level and have additional bandwidth left over. This additional bandwidth may be used to request replacement portions of the media stream which had previously been downloaded at the reduced quality level. The replacement portions would be at a greater quality level compared to the previously downloaded versions.

The streaming media application may then overwrite the previously downloaded portions of the media stream in the buffer with the newly obtained higher quality portions of the media stream. When these portions of the media stream are rendered by the client, the higher quality replacement portions of the media stream will be rendered instead of the previously downloaded lower quality portions of the media stream. This prevents the user of the client from experiencing the perceptible decline in the quality of the media stream that would have been experienced without replacing the lower quality portions of the media stream.

In the following discussion, a general description of the system and its components is provided, followed by a discussion of the operation of the same.

With reference to FIG. 1, shown is a networked environment 100 according to various embodiments. The networked environment 100 includes a computing environment 101, and a client device 104, which are in data communication with each other via a network 107. The network 107 includes, for example, the Internet, intranets, extranets, wide area networks (WANs), local area networks (LANs), wired networks, wireless networks, or other suitable networks, etc., or any combination of two or more such networks.

The computing environment 101 may comprise, for example, a server computer or any other system providing computing capability. Alternatively, the computing environment 101 may employ a plurality of computing devices that may be employed that are arranged, for example, in one or more server banks or computer banks or other arrangements. Such computing devices may be located in a single installation or may be distributed among many different geographical locations. For example, the computing environment 101 may include a plurality of computing devices that together may comprise a cloud computing resource, a grid computing resource, and/or any other distributed computing arrangement. In some cases, the computing environment 101 may correspond to an elastic computing resource where the allotted capacity of processing, network, storage, or other computing-related resources may vary over time.

Various applications and/or other functionality may be executed in the computing environment 101 according to various embodiments. Also, various data is stored in a data store 111 that is accessible to the computing environment 101. The data store 111 may be representative of a plurality of data stores 111 as can be appreciated. The data stored in the data store 111, for example, is associated with the operation of the various applications and/or functional entities described below.

The components executed on the computing environment 101, for example, include a media distribution service 114, and other applications, services, processes, systems, engines, or functionality not discussed in detail herein. The media distribution service 114 is executed to communicate a media item 117 as a stream of media blocks 121 to a client 104 for rendering. For example, the media distribution service 114 may comprise a streaming video service, streaming audio service, or other service. The media distribution service 114 may stream a stored media item 117 which has been generated by a content provider. The media distribution service 114 may also stream media items 117 live as the media item 117 is being generated. This may include a live video feed, live audio feed, streaming radio, or other live media streams.

The media item 117 comprises audio or visual content which may be rendered by a client 104. The media item 117 may comprise an audio media item, video media item, audio/video item, or other type of media item 117 as can be appreciated. The media item 117 may include one or more audio tracks corresponding to various languages, content explicitness ratings, or other audio tracks. Additionally, the media item 117 may include text or string information to be rendered concurrent to audio or video data. For example, the media item 117 may include subtle tracks, closed captioning tracks, information or trivia popups, or other data.

To this end, the media distribution service 114 may obtain a request 124 from a client 104 for one or more media blocks 121 that make up a media item 117 accessible for distribution by the media distribution service 114. Media blocks 121 comprise a subcomponent or subdivision of the media item 117 to be communicated to the client 104 in a stream via the network 107 to facilitate a rendering of the media item 117 by the client 104.

A request 124 from the client 104 may specify that the media blocks 121 are to be encoded at a requested quality level 127. The quality level 127 may comprise a bitrate, resolution, or other parameter associated with a rendering quality of the media item 117. For example, the quality level 127 may specify that the media blocks 121 are to be encoded at a 1280×720 progressive (720p) video mode, a 1900×1080 progressive (720p) video mode, or other video mode. As another example, the quality level 127 may specify a bitrate necessary to communicate the media block 121 to a client 104 given available bandwidth from the respective communication channel. Such bitrates will correspond to the various quality levels set forth above. This allows the media distribution service 114 to determine a resolution, audio quality, video quality, or other parameters for the media block 121 such that the resulting media block 121 may be communicated at the requested bitrate.

The data stored in the data store 111 includes, for example, media items 117, and potentially other data. The media items 117 represent content which may be streamed by the media distribution service 114 to clients 104. This may include audio data, video data, audio/video data, subtitle tracks, closed captioning tracks, and potentially other data.

The client 104 is representative of a plurality of client devices that may be coupled to the network 107. The client 104 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 104 may include a display 131. The display 131 may comprise, for example, one or more devices such as liquid crystal display (LCD) displays, gas plasma-based flat panel displays, organic light emitting diode (OLED) displays, LCD projectors, or other types of display devices, etc.

The client 104 may be configured to execute various applications such as a streaming media application 134 and/or other applications. The streaming media application 134 is configured to communicate requests 124 to the media distribution service 114 for media blocks 121. The obtained media blocks 121 may be stored in a buffer 137 of the client 104 prior to being rendered. The streaming media application 134 also facilitates a rendering of a media item 117 streamed in media blocks 121 to the client 104 by the media distribution service 114. The streaming media application 134 may be configured to monitor an amount of network 107 bandwidth accessible to the client 104 in order to determine a quality level 127 at which a media block 121 will be requested. Bandwidth may comprise a rate of successful data transfer between the client 104 and the computing environment 101. For example, the streaming media application 134 may determine that the client 104 has access to enough network 107 bandwidth to enable a four megabits-per-second stream, and therefore communicate a request 124 for a media block 121 encoded at a quality level 127 of four megabits-per-second.

The streaming media application 134 may also be configured to determine when excess network 107 bandwidth is available. The excess network 107 bandwidth would allow the streaming media application 134 to concurrently generate requests 124 a stream of media blocks 121 at a given quality level 127 and generate requests 124 for media blocks 121 to replace previously downloaded media blocks 121 having a reduced quality level 127. The streaming media application 134 may then overwrite the previously obtained media blocks 121 in the buffer 137. This allows the higher quality replacement media blocks 121 to be rendered instead of the lower quality media blocks 121. The client 104 may be configured to execute applications beyond the streaming media application 134 such as, for example, email applications, social networking applications, word processors, spreadsheets, and/or other applications.

Next, a general description of the operation of the various components of the networked environment 100 is provided. To begin, the streaming media application 134 initiates a stream of a media item 117 from the media distribution service 114 via the network 107. This may comprise generating repeatedly requests 124 for media blocks 121 generated from the media item 117 at a predefined quality level 127, at a maximum quality level 127 possible based at least in part on an amount of available network 107 bandwidth, or at another quality level 127.

The media distribution service 114 then, responsive to obtained requests 124, communicates media blocks 121 of the media item 117 encoded at the quality level 127 embodied in the requests 124. In some embodiments, the media item 117 may be encoded at a quality level 127 distinct from the quality level 127 of the media blocks 121 embodied in the request 124. In such an embodiment, the media distribution service 114 may perform a transformation on the media item 117 or a media block 121 to generate a media block 121 conforming to the quality level 127 of the request 124. This may comprise applying a compression algorithm, encoding algorithm, decoding algorithm, or other transformation to the media item 117 or the media block 121. The media distribution service 114 then communicates the requested media block 121 to the client 104. In other embodiments in which the requested quality level 127 is less than the quality level 127 at which the media item 117 is encoded, the media distribution service 114 may communicate the media block 121 at the quality level 127 of the media item 117 or some other default quality level 127. The streaming media application 134 then stores obtained media blocks 121 in a buffer 137.

After obtaining a media blocks 121, the streaming media application 134 may store the media block 121 in a buffer 137 accessible to the client 104. Concurrent to obtaining the stream of media blocks 121, the streaming media application 134 may render one or more media blocks 121 stored in the buffer 137. This may comprise, for example, rendering audio data, rendering image or video data on the display 131, or other performing other functions.

During the streaming process, the streaming media application 134 may detect an amount of network 107 bandwidth available to the client 104. The streaming media application 134 may then use this amount of available network 107 bandwidth to determine a quality level 127 for requesting media blocks 121, or for another purpose.

During the streaming of the media item 117, the client 104 may experience a decrease in available network 107 bandwidth. The decrease in available network 107 bandwidth may be the result of a distribution of shared bandwidth, bandwidth throttling, a malfunction or defect in network 107 components, interference, or another situation. The decrease in available network 107 bandwidth may also be due to a state of a client 104, such as currently executing applications, operational or defective components of the client 104, or other attributes of the client 104. Due to the decrease in network 107 bandwidth, the streaming media application 134 decreases the quality level 127 for generated requests 124 accordingly. This results in the requested media blocks 121 subsequently stored in the buffer 137 having a lower quality level 127.

The streaming media application 134 may also determine that the client 104 has access to more network 107 bandwidth than is required to stream the media item 117 at a highest possible quality level 127. In such an embodiment, the streaming media application 134 may request the media block 121 at the highest possible quality level 127 for the media item 117. The streaming media application 134 may determine the maximum available quality level 127 by a handshake or other querying communication performed with the media distribution system 114 to initiate or facilitate a streaming of the media item 117. The streaming media application 134 may also request media blocks 131 at a quality level 127 as a function of user preferences associated with the client 104 or the streaming media application 134, or other data.

Next, the streaming media application 134 may detect that an amount of available network 107 bandwidth exceeds an amount of network 107 bandwidth required to facilitate the stream of the media item 117. For example, the streaming media application 134 may determine that eight megabits-per-second of network 107 bandwidth is available, while only four megabits-per-second of network 107 bandwidth is required for a currently streaming media item 117. This results in an excess of four-megabits-per-second of network 107 bandwidth.

After detecting excess network 107 bandwidth, the streaming media application 134 may trigger a replacement of a media block 121 stored in the buffer 137. In some embodiments, a replacement of a buffered media block 121 is triggered when the amount of excess network 107 bandwidth meets or exceeds a predefined bandwidth threshold amount. The threshold amount may comprise an amount of network 107 bandwidth required to obtain a replacement media block 121 at a defined quality level 127, a maximum quality level 127, at a quality level 127 greater than that of a buffered media block 121, or some other amount.

For example, if the streaming media application 134 detects excess bandwidth to facilitate a four megabits-per-second stream and media blocks 121 are currently being streamed at four megabits-per-second, this may indicate that a replacement media block 121 may be obtained at a quality level 127 encoded at or below four megabits-per-second. As another example, the lowest quality level 127 of a buffered media block 121 may be encoded for communication at two megabits-per-second. If the streaming media application 134 detects one megabit-per-second of excess bandwidth, this may not trigger a replacement of a buffered media block 121 as the excess bandwidth would not allow for a replacement media block 121 to be encoded for communication at greater than two megabits-per-second.

If the replacement of a buffered media block 121 has been triggered, the streaming media application 134 will then select a buffered media block 121 to be replaced. In some embodiments, the selected media block 121 may be a media block 121 having a quality level 127 below a predefined quality level 127 threshold. The threshold may comprise a defined quality level 127, a highest available quality level 127 at which the corresponding media item 117 may be streamed, or some other threshold. The selected media block 121 may also comprise the media block 121 having the lowest quality level 127 overall, or a quality level 127 deviating from quality levels 127 of sequentially adjacent media blocks 121. For example, a media block 121 may have a quality level 127 lower than a preceding and subsequent media block 121. Were this to be rendered, it may result in a noticeable deviation in the perceived quality of the media stream. Therefore, the media block 121 with the deviating quality level 127 may be selected for replacement to ensure a consistent overall quality level 127 of the stream. The media block 121 may also be selected by another approach.

After the selecting the media block 121, the streaming media application may then generate a request 124 for a replacement media block 121. The replacement media block 121 corresponds to the same portion of the media item 117 as the selected media block 121, but at a higher quality level 127 than the original. The replacement media block 121 may be requested at a preferred quality level 127, such as a predefined quality level 127 associated with the stream of the media item 117, a maximum quality level 127 at which a media block 121 can be obtained, or some other quality level 127. The quality level 127 of the replacement media block 121 may be based at least on part on the quality level 127 of sequentially adjacent media blocks 121 with respect to an order of rendering. For example, if a preceding or subsequent media block 121 is encoded at a quality level 127 of four megabits-per-second, the replacement media block 121 may be requested at a quality level 127 of four megabits-per-second to reduce variations in quality levels 127 of rendered media blocks 121.

The quality level 127 may also be based at least in part on an amount of network 107 bandwidth in excess of that required to maintain stream the media blocks 121. For example, the stream of media blocks 121 may be encoded for transfer at five megabits-per-second and the client 104 may have eight megabits-per-second of network 107 bandwidth available. The quality level 127 of the replacement media block 121 may then be encoded for transfer at most three megabits-per-second. The quality level 127 of the replacement media block 121 may also be based on other factors.

The generated request 124 for the replacement media block 121 is then communicated concurrently to a request 124 for maintaining the stream of the media item 117. This may comprise communicating distinct requests 124 or encoding a combined request for the replacement media block 121 and the next media blocks 121 to be streamed. After communicating the request 124 for the replacement media block 121, the streaming media application 134 obtains the replacement media block 121 via the network 107. The replacement media block 121 is then stored in the buffer 137, replacing the corresponding selected media block 121. Because the replacement media block 121 is stored before the selected media block 121 was rendered, the replacement media block 121 will be rendered instead of the lower quality media block 121. This prevents a user of the streaming media application 134 only experiencing a perceptible decline in rendering quality of the media item 117.

Figure 2A:
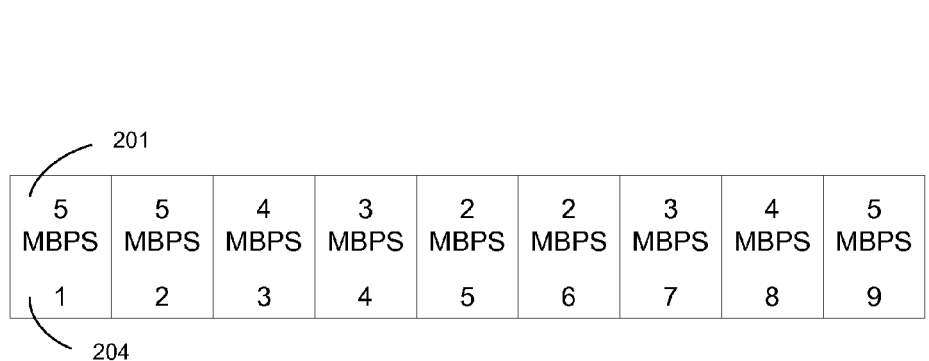
FIGS. 2A and 2B are drawings of an example of a buffer accessible to a streaming media application implemented in a client of FIG. 1.
Figure 2B:
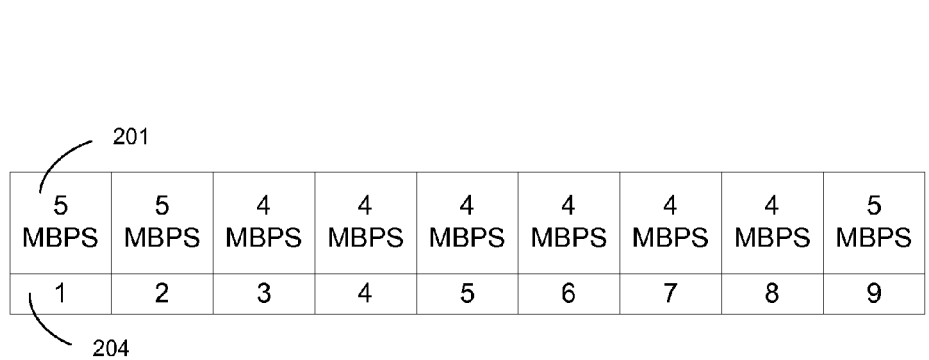

Referring next to FIGS. 2A and 2B, shown are example diagrams depicting a buffer 137 (FIG. 1) accessible to the streaming media application 134 (FIG. 1) implemented in a client 104 (FIG. 1) of the networked environment 100 (FIG. 1). The buffer 137 comprises a plurality of cells, each storing a media block 121 (FIG. 1). Within each cell is a label 201 indicating a bitrate quality level 131 (FIG. 1) at which the corresponding media block 121 is encoded. The bitrate of the corresponding media block 121 may be a function of a video resolution, video bitrate, audio bitrate, or other attributes at which the media block 121 is encoded. Also within each cell is an index label 204 indicating an order in which the buffered media blocks 121 are stored. In this example, it is understood that the media blocks 121 are stored in an order in which the media blocks 121 are to be rendered, however the media blocks 121 may be stored in the buffer by another approach.

FIG. 2A depicts a state of the buffer 137 after storing media blocks 121 following a decrease in network 107 bandwidth during a time corresponding to indices 3-8. While the media blocks 121 stored in indices 1 and 2 are stored at a quality level 127 of five megabits-per-second, the media blocks 121 in indices 3-8 vary in quality level 127 from two to four megabits-per-second.

FIG. 2B depicts a state of the buffer 137 after several iterations of replacing buffered media blocks 121 by the streaming media application 134 with replacement media blocks 121 of higher quality levels 127. In this example, media blocks 121 at indices 4-7 have been replaced with media blocks 121 having a quality level 127 of four megabits-per-second. By replacing these media blocks 121 with replacement media blocks 121 having a quality level 127 of four megabits-per-second, there is a reduced variance between the quality levels 127 of media blocks 121 at indices 4-7 and the quality levels 127 of media blocks 121 at indices 3 and 8, thereby producing less noticeable variance by a viewer of the rendered media blocks 121. Media blocks 121 at indices 4-7 may be replaced at other quality levels 127 beyond those shown.

Figure 3:
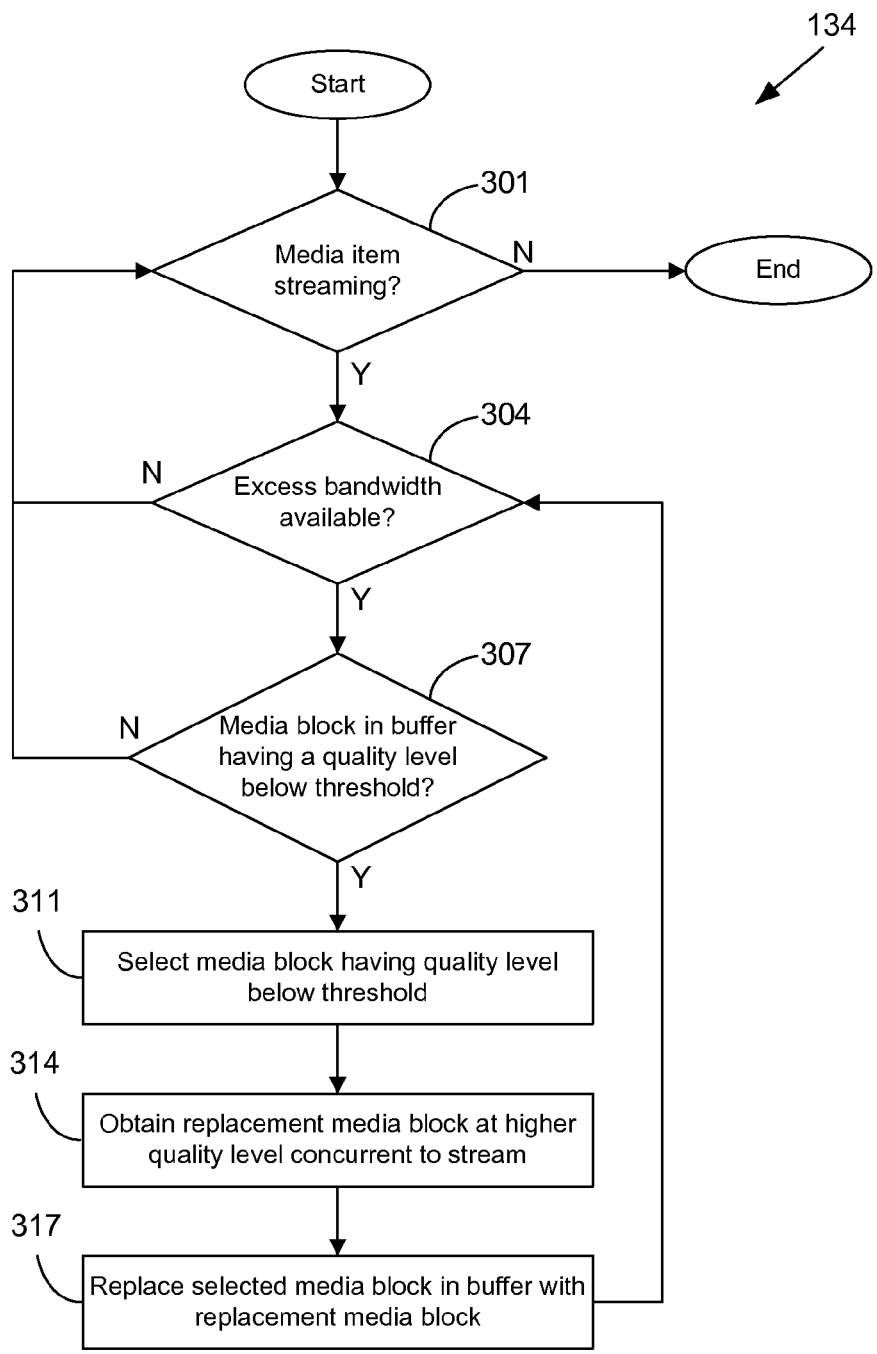
FIG. 3 is a flowchart illustrating one example of functionality implemented as portions of a streaming media application executed in a computing environment in the networked environment of FIG. 1 according to various embodiments of the present disclosure.

Turning now to FIG. 3, shown is a flowchart that provides one example of the operation of a portion of the streaming media application 134 according to various embodiments. It is understood that the flowchart of FIG. 3 provides merely an example of the many different types of functional arrangements that may be employed to implement the operation of the portion of the streaming media application 134 as described herein. As an alternative, the flowchart of FIG. 3 may be viewed as depicting an example of steps of a method implemented in the client 104 (FIG. 1) according to one or more embodiments.

Beginning with box 301, the streaming media application 134 determines if a stream of media blocks 121 (FIG. 1) is being streamed to the client 104 from a media distribution service 114 (FIG. 1). The stream of media blocks 121 may be obtained by the streaming media application 134 or another client application executed in the client 104. The media blocks 121 may be encoded at a quality level 127 (FIG. 1) such as a highest possible quality level 127 available with respect to a media item 117 (FIG. 1), a quality level 127 defined as a function of a user preference, a quality level 127 calculated as a function of available network 107 (FIG. 1) bandwidth, or another quality level 127.

If a stream of media blocks 121 is not being communicated to the client 104, the process ends. Otherwise, in box 304, the streaming media application 134 determines if there is network 107 bandwidth available in excess of what is required to facilitate the stream of media blocks 121. This may comprise, for example, calculating a difference between an amount of network 107 bandwidth required to obtain the stream of media blocks 121 and an amount of available network 107 bandwidth and determining if the difference exceeds a predefined bandwidth threshold. The amount of available network 107 may be calculated by generating a ping or round trip communication to the media distribution service 114, or by another approach. Other approaches may also be used to determine if there is network 107 bandwidth available in excess of what is required to facilitate the stream of media blocks 121.

If there is no excess network 107 bandwidth available, the process goes back to box 301 where the streaming media application 134 continues to determine if a stream media blocks 121 is being communicated to the client 104. If there is excess network 107 bandwidth available, the process proceeds to box 307 where the streaming media application 137 determines if there is a media block 121 stored in a buffer 137 (FIG. 1) having a quality level 137 below a quality level 137 threshold, indicative of the media blocks 121 having been obtained during a period of reduced network 107 bandwidth. The threshold may comprise a defined baseline quality level 127 at which the streaming media application 134 obtains media blocks 121, a highest possible quality level 127 with respect to the media item 117 corresponding to the media blocks 121, or some other threshold.

If there are no media blocks 121 stored in the buffer 137 having a quality level 127 below the threshold, the process returns back to box 301. Otherwise, the process moves on to box 311 where the streaming media application 137 selects one of the media blocks 121 in the buffer 137 having a quality level 127 below the threshold. Selecting the media block 121 may be based at least in part on a minimum quality level 127 of media blocks 121 stored in the buffer 137. Selecting the media block 121 may also be based at least in part on a degree of variance between quality levels 127 of media blocks 121 stored in the buffer 137, or by another approach.

After selecting the media block 121, the streaming media application 134 obtains a replacement media block 121 corresponding to the selected media block 121 at a greater quality level 127. This may comprise generating a request 124 (FIG. 1) for the replacement media block 121 and communicating the request 124 to the media distribution service 114. The replacement media block 121 is then obtained from the network 107 in response to the request 124. The replacement media block 121 may also be obtained by another approach.

The greater quality level 127 may be based at least in part on the quality levels 127 of other media blocks 121 stored in the buffer 137 such as one or more sequentially preceding or subsequent media blocks 121 or other media blocks 121 stored in the buffer 137. For example, the greater quality level 127 may be calculated to reduce the difference in quality levels between a replacement media block 121 and the preceding or subsequent media blocks 121. In such an embodiment, although there would still be a difference between the quality levels 127 of a replacement media block 121 and adjacent media blocks 121, the variation in quality levels 127 would be reduced, minimizing perceptible deviations in quality upon rendering.

As another example, the greater quality level 127 of the replacement media block 121 may be calculated to be the same as the quality levels 127 of the preceding and subsequent media block 121. The greater quality level 127 may also be based at least in part on a quality level 127 at which the stream of media blocks 121 is currently being obtained, or determined by another approach. The replacement media block 121 is obtained concurrently to the stream of media blocks 121 to prevent a degradation of performance of the stream due to the replacement process. The excess bandwidth used to obtain the replacement media block 121 ensures that the current stream of media blocks 121 is unaffected.

After obtaining the replacement media block 121, in box 314, the streaming media application 137 replaces the selected media block 121 with the replacement media block 121 such that the replacement media block 121 is rendered instead of the selected media block 121. After replacing the selected media block 121, the process repeats the steps of selecting and replacing media blocks 121 until there is no excess network 107 bandwidth as determined in box 304 or there are no media blocks 121 in the buffer 137 having quality levels 127 below a threshold as determined in box 307.

Figure 4:
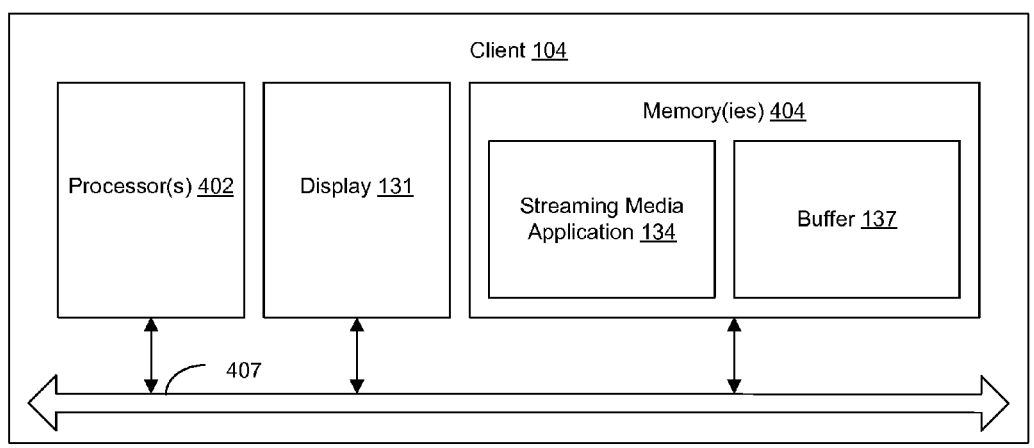
FIG. 4 is a schematic block diagram that provides one example illustration of a client employed in the networked environment of FIG. 1 according to various embodiments of the present disclosure.

With reference to FIG. 4, shown is a schematic block diagram of the client 104 according to an embodiment of the present disclosure. Each client 104 includes at least one processor circuit, for example, having a processor 402 and a memory 404, both of which are coupled to a local interface 407. To this end, each client 104 may comprise, for example, at least one computer or like device. The local interface 407 may comprise, for example, a data bus with an accompanying address/control bus or other bus structure as can be appreciated. Additionally, the client 104 may include a display 131.

Stored in the memory 404 are both data and several components that are executable by the processor 402. In particular, stored in the memory 404 and executable by the processor 402 are a streaming media application 134, and potentially other applications. Also stored in the memory 404 may be a buffer 137 and other data. In addition, an operating system may be stored in the memory 404 and executable by the processor 402.

It is understood that there may be other applications that are stored in the memory 404 and are executable by the processor 402 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 404 and are executable by the processor 402. In this respect, the term "executable" means a program file that is in a form that can ultimately be run by the processor 402. Examples of executable programs may be, for example, a compiled program that can be translated into machine code in a format that can be loaded into a random access portion of the memory 404 and run by the processor 402, source code that may be expressed in proper format such as object code that is capable of being loaded into a random access portion of the memory 404 and executed by the processor 402, or source code that may be interpreted by another executable program to generate instructions in a random access portion of the memory 404 to be executed by the processor 402, etc. An executable program may be stored in any portion or component of the memory 404 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 404 is defined herein as including both volatile and nonvolatile memory and data storage components. Volatile components are those that do not retain data values upon loss of power. Nonvolatile components are those that retain data upon a loss of power. Thus, the memory 404 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 402 may represent multiple processors 402 and/or multiple processor cores and the memory 404 may represent multiple memories 404 that operate in parallel processing circuits, respectively. In such a case, the local interface 407 may be an appropriate network that facilitates communication between any two of the multiple processors 402, between any processor 402 and any of the memories 404, or between any two of the memories 404, etc. The local interface 407 may comprise additional systems designed to coordinate this communication, including, for example, performing load balancing. The processor 402 may be of electrical or of some other available construction.

Although the streaming media application 134, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 3 shows the functionality and operation of an implementation of portions of the streaming media application 134. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 402 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including a streaming media application 134, that comprises software or code can be embodied in any non-transitory computer-readable medium for use by or in connection with an instruction execution system such as, for example, a processor 402 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, the program, when executed by the at least one computing device, causing the at least one computing device to at least:
   obtain a media stream comprising a plurality of streaming media blocks, the streaming media blocks each having a bitrate;
   store, during the obtaining, the streaming media blocks in a buffer;
   select, responsive to an increase in an available bandwidth, a one of the streaming media blocks stored in the buffer being earliest in rendering sequence with respect to others of the streaming media blocks and having the bitrate below a bitrate threshold, the bitrate threshold specifying a highest available bitrate of the media stream;
   obtain, concurrent to obtaining the media stream, a replacement media block for the selected one of the streaming media blocks, the replacement media block corresponding a portion of a media item encoded by the selected one of the streaming media blocks, the bitrate of the replacement media block being greater than the bitrate of the selected one of the streaming media blocks, the bitrate of the replacement media block being based at least in part on a difference between the available bandwidth and an amount of bandwidth required to facilitate obtaining the media stream; and
   replace in the buffer the selected one of the streaming media blocks with the replacement media block prior to a rendering of the selected one of the streaming media blocks.

2. The non-transitory computer-readable medium of claim 1, wherein the bitrate of the replacement media block is further based at least in part on the bitrate of a sequentially adjacent one of the streaming media blocks.

3. The non-transitory computer-readable medium of claim 1, wherein the bitrate threshold comprises a highest available bitrate of the media stream.

4. A system, comprising:
   at least one computing device comprising a buffer, the at least one computing device being configured to at least:
   select one of a plurality of streaming media blocks stored in the buffer having a quality level below a predefined quality threshold;
   obtain, from a media distribution service, contemporaneous to a stream of the streaming media blocks being communicated to the at least one computing device by the media distribution service, a replacement media block for the selected one of the streaming media blocks, the replacement media block corresponding a portion of a media item encoded by the selected one of the streaming media blocks, wherein the quality level of the replacement media block is greater than the quality level of the selected one of the streaming media blocks;
replace, after obtaining the replacement media block, the selected one of the streaming media blocks in the buffer with the replacement media block; and
wherein the streaming media blocks are stored in the buffer prior to being rendered by the at least one computing device.

5. The system of claim 4, wherein the quality level comprises a bitrate or resolution.

6. The system of claim 4, wherein the stream is obtained at a requested quality level, the at least one computing device being further configured to at least:
determine an amount of available network bandwidth;
determine whether the amount of available network bandwidth meets a total amount of required bandwidth to facilitate obtaining the stream at the requested quality level and the replacement media block; and
wherein obtaining the replacement media block is performed responsive to determining that the amount of available bandwidth meets the total amount of required bandwidth.

7. The system of claim 6, wherein the quality level of the replacement media block is based at least in part on a difference between the amount of available network bandwidth and an amount of bandwidth required to facilitate obtaining the stream at the requested quality level.

8. The system of claim 4, wherein the quality level of the replacement media block is based at least in part on the quality level of a sequentially adjacent one of the streaming media blocks.

9. The system of claim 4, wherein the quality level of the replacement media block is based at least in part on an average quality level of the streaming media blocks.

10. The system of claim 4, wherein the threshold comprises a highest available quality level associated with the streaming media blocks.

11. The system of claim 4, wherein the one of the streaming media blocks is selected based at least in part on an order of rendering the streaming media blocks.

12. The system of claim 4, wherein the selected one of the streaming media blocks is a one of the streaming media blocks having a lowest quality level.

13. A method, comprising:
obtaining, in a computing device, a media stream comprising a plurality of streaming media blocks, the streaming media blocks having a quality level based at least in part on an available bandwidth;
storing, in the computing device, during the obtaining, the streaming media blocks in a buffer;
determining, in the computing device, whether the quality level of a one of the streaming media blocks stored in the buffer falls below a quality level threshold;
obtaining, in the computing device, responsive to the determination, concurrent to obtaining the media stream, a replacement media block for the one of the streaming media blocks, the replacement media block corresponding a portion of a media item encoded by the one of the streaming media blocks, wherein the replacement media block has a greater quality level than the one of the media blocks; and
replacing, in the computing device, the one of the streaming media blocks in the buffer with the replacement media block prior to a rendering of the one of the streaming media blocks.

14. The method of claim 13, wherein the one of the streaming media blocks stored in the buffer is one of a plurality of streaming media blocks having quality level falling below the quality level threshold, and further comprising selecting, in the computing device, the one of the streaming media blocks being a respective one of the streaming media blocks having quality level falling below the quality level threshold to be rendered first.

15. The method of claim 13, wherein the one of the streaming media blocks is one of a plurality of streaming media blocks having a quality level falling below the quality level threshold, and further comprising selecting, in the computing device, the one of the streaming media blocks as a one of the streaming media blocks having a lowest quality level.

16. The method of claim 13, wherein the quality level comprises a bitrate or resolution.

17. The method of claim 13, wherein the threshold comprises a highest available quality level of the media stream.

18. The method of claim 13, wherein the quality level of the replacement media block is based at least in part on the quality level of a sequentially adjacent one of the streaming media blocks.

19. The method of claim 13, wherein the quality level of the replacement media block is based at least in part on a difference between the available bandwidth and an amount of bandwidth required to facilitate obtaining the media stream.

20. The method of claim 13, wherein the determining, obtaining, and replacing are performed responsive to an increase in the available bandwidth.

* * * * *